Patented July 27, 1954

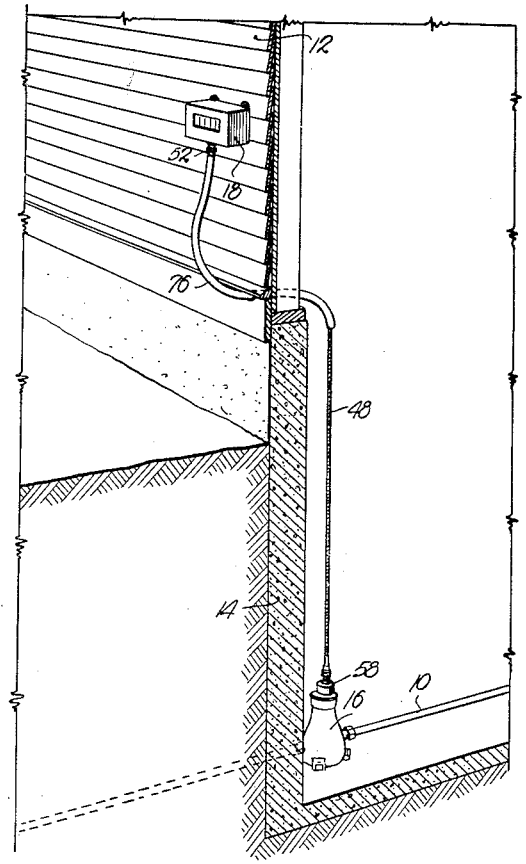
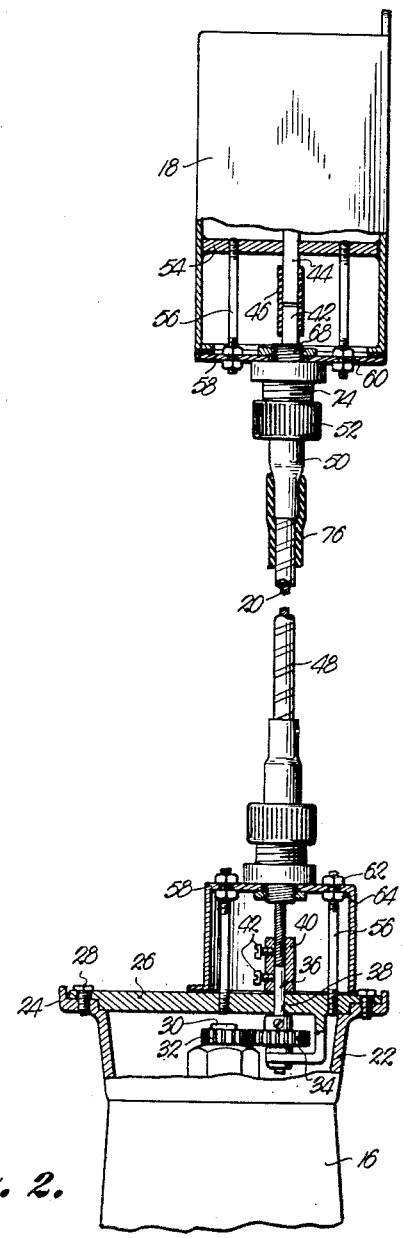
Fig. 1.
Fig. 2.
INVENTOR.
William C. Bryant

2,684,810

UNITED STATES PATENT OFFICE 2,684,810

FLOWMETER HAVING REMOTE REGISTER

William C. Bryant, Kansas City, Kans.

Application September 25, 1953, Serial No. 382,369

1 Claim. (Cl. 235—91)

This invention relates to flow-meters of the type adapted to measure the quantity of fluid passing through a conduit, and the primary object of the invention is to provide such a meter with registering means that is disposed in an accessible location while the portion thereof that is activated directly by the fluid is at the conduit and in a comparatively difficult place to reach and view.

It is a further object of this invention to provide a suitable interconnection between the flow-meter itself and its remotely associated register which will permit locating the register at a point outside a building where it is readily accessible to the meter reader while the fluid activated portion is within the building.

A further aim of this invention is to provide a register and coupling apparatus for water meters or the like that may be quickly and easily attached to the meter, with the register at a more convenient location for reading than was the water meter.

The register and coupling embodying this invention is particularly adapted to render basement-located meters readable at a point outside the building simply by removing the conventional registering head of the meter and affixing one end of the coupling to the meter.

Many additional objects will be made clear during the course of the following specification, reference being had to the accompanying drawing, wherein:

Figure 1 is a perspective view of a flow-meter, having remote register made in accordance with my invention and illustrating the same installed in a building in such fashion as to render reading a normally inside meter from a point outside the building.

Fig. 2 is an enlarged fragmentary view of the flow-meter assembly with the detachable couplings between the flexible shaft and the register and the flow-meter respectively shown in detail.

Referring now to the accompanying drawing wherein like reference characters refer to similar parts, a sub-surface fluid flow line 10 is shown entering a building 12 through foundation wall 14.

A flow-meter 16 is placed in the fluid flow line to measure the quantity or rate of flow. In the usual construction of flow-meters the register forms a part thereof, and consequently, when the meter is located in an out of the way corner or inaccessible part of the basement of a building, it becomes difficult and inconvenient for the meter reader to check the meter at periodic intervals. To avoid this problem, a remote register 18 is provided which can be placed at any convenient location on the exterior of the building 12. To facilitate the remote location of the register 18, a flexible shaft 20 is used to transmit movement of the driven portion of the flow-meter 16 to the register 18.

A standard flow-meter 16 is provided with an upper cup-shaped body 22, flanged as at 24 to receive its uppermost wall 26. The wall 26 is secured in place by bolts 28.

The passage of fluid through the flow-meter causes a rotation of shaft 30, gears 32 and 34, and pin 36. The latter is free to rotate in opening 38 in wall 26. The pin 36 is, in turn, releasably coupled to flexible shaft 20 by means of sleeve 40, the latter being held in place by set screws 42.

At its opposite end the flexible shaft 20 is enclosed by a cap 42. The pin 44, leading from the recording cylinders of the register 18 is joined to the cap 42 on shaft 20 by means of a tubular rubber sleeve 46. In this manner the activity of the flow-meter 16 is transmitted to the register 18, regardless of the distance between the two.

As indicated in the drawing, the flexible shaft 20 is provided with a protective sheath 48 which is press fit at either end thereof into metal sockets 50 having knurled knobs 52. The sheath 48 is necessarily shorter than the flexible shaft 20, so that the ends of the shaft 20 will be free to permit coupling thereof to the pins 36 and 44, by means of sleeves 40 and 46.

The lower wall 54 of the register 18 and the upper wall 26 of the flow meter 16 each threadably receive a plurality of rods 56, which are threaded at both ends. The plates 58, having openings 60 therein, are held in spaced relationship to their respective walls 54 and 26 by means of pairs of nuts 62 and 64 on each rod 56 and are provided with central openings 66 through which the threaded ends of plugs 68 are inserted. The latter are held locked against the plates 58 by means of lock washers 70 and the hub 72 of plugs 68. The other ends of the plugs 68 are threaded as at 74 to receive the internally threaded knurled knobs 52 of metal sockets 50. The plugs 68 and the sockets 50 are centrally bored for the passage of the free ends of the flexible shaft 20. Rotation of the knurled knobs 52 with relation to socket 50 serves to clamp the socket 50 to the plug 68.

A rubber tubing 76 is telescoped over the sheath 48 throughout the length of the latter that is to be exposed to the weather and before the socket 50 is press fit thereon.

In actual practice the plates 58 are cup-shaped, and the side walls thereof extend to the walls 54 and 26 to prevent tampering and accidental damage to the couplings at either end of the flexible shaft 20. Additionally these cup-shaped bodies 58 serve to protect the moving parts from the effects of the weather.

It is now apparent that a novel means has been provided for reading otherwise inaccessible flow-meters. By my invention I have eliminated the need for meter readers to search for otherwise hidden meters when they are making their rounds. Regardless of the location of the meter, its associated register is placed where it will be most accessible to the meter reader and in a position where he can observe it without the necessity of even entering the building.

A register for practically any type of flow-meter may be coupled in such manner as to permit reading from a convenient place. In the form of the invention shown, an ordinary water meter has had associated therewith a register and coupling assembly, merely by removing the conventional registering head and replacing the same by plate 26 and its related parts. The meter 15 need not be otherwise changed as to location, operation or structure. Thus the register and coupling may be separately made and installed in buildings having inside meters, thus making it possible to read the meter from outside the building.

It is apparent from the foregoing that many changes and modifications may be made without departing from the spirit of this invention, and therefore, it is to be limited only by the scope of the appended claim.

Having thus described the invention what is claimed as new and desired to be secured by Letters Patent, is:

In a flow-meter having an open top housing, a meter shaft rotatable by the flow of water in the meter, a remote register, a flexible shaft interconnecting the meter shaft and said register for transferring the movement of the meter shaft to the register, and a flexible, protective sheath on the flexible shaft substantially throughout the length thereof, a closure wall for said housing having an opening therein; a pin extending through said opening and mounted for rotation therein; gear means within the housing operably interconnecting said meter shaft and said pin; an inverted, cup-shaped body rigidly attached to said closure wall exteriorly of said housing, said body including an end wall having a central opening therein and side walls engaging said closure wall, said central opening being in alignment with the opening in said closure wall and spaced from the center of said closure wall; a hollow socket telescoped over said flexible shaft and secured to said sheath; means for maintaining the alignment of said sheath, flexible shaft and pin, adjacent said housing, comprising an externally threaded, hollow plug in said central opening and an internally threaded knob rotatably mounted on said socket for coupling said socket and said plug, said flexible shaft extending through said plug and into said body; and means operably interconnecting said pin and said flexible shaft.

References Cited in the file of this patent
UNITED STATES PATENTS

| Number | Name | Date |
|---|---|---|
| 2,094,711 | Leininger | Oct. 5, 1937 |